US007182066B2

(12) United States Patent
Goya et al.

(10) Patent No.: US 7,182,066 B2

(45) Date of Patent: Feb. 27, 2007

(54) CONTROL APPARATUS FOR INTERNAL COMBUSTION ENGINE AND METHOD OF CALCULATING INTAKE AIR QUANTITY FOR SAME

(75) Inventors: Yoichiro Goya, Susono (JP); Hidenori Moriya, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/563,829

(22) PCT Filed: Jul. 8, 2004

(86) PCT No.: PCT/JP2004/010078

§ 371 (c)(1),
(2), (4) Date: Jan. 6, 2006

(87) PCT Pub. No.: WO2005/008049

PCT Pub. Date: Jan. 27, 2005

(65) Prior Publication Data

US 2006/0224296 A1 Oct. 5, 2006

(30) Foreign Application Priority Data

Jul. 17, 2003 (JP) ............................ 2003-276272

(51) Int. Cl.
*F02M 7/00* (2006.01)
*B60T 7/12* (2006.01)

(52) U.S. Cl. ....................... 123/435; 123/704; 701/103

(58) Field of Classification Search ................ 123/435, 123/443, 704, 295, 305, 478; 701/102, 103, 701/104, 115
See application file for complete search history.

(56) References Cited

U.S. PATENT DOCUMENTS 5,044,343 A * 9/1991 Kanno et al. ............... 123/493
5,156,126 A * 10/1992 Ohkubo et al. ........ 123/406.43
5,970,947 A * 10/1999 Iida et al. .................. 123/295

FOREIGN PATENT DOCUMENTS

| | | |
|---|---|---|
| JP | A 7-42607 | 2/1995 |
| JP | A 7-133742 | 5/1995 |
| JP | A 9-53503 | 2/1997 |
| JP | A 2001-207889 | 8/2001 |

* cited by examiner

*Primary Examiner*—John T. Kwon
(74) *Attorney, Agent, or Firm*—Oliff & Berridge, PLC

(57) ABSTRACT

An internal combustion engine (1) generates power by burning a mixture of fuel and air in each combustion chamber (3). The internal combustion engine (1) is provided with an in-cylinder pressure sensor (15) disposed in the combustion chamber (3) and an ECU (20). The ECU (20) calculates control parameters each of which is a product of an in-cylinder pressure detected by the in-cylinder pressure sensor (15) and a value obtained by exponetiating an in-cylinder volume at timing of detecting the in-cylinder pressure with a predetermined index at two predetermined points during a period from opening timing of an intake valve (Vi) to closing timing thereof, and calculates a quantity of air aspirated into each combustion chamber (3) based upon a difference in the control parameter between the two predetermined points.

10 Claims, 4 Drawing Sheets

CONTROL APPARATUS FOR INTERNAL COMBUSTION ENGINE AND METHOD OF CALCULATING INTAKE AIR QUANTITY FOR SAME

TECHNICAL FIELD

The present invention relates to a control apparatus and a method of calculating an intake air quantity for an internal combustion engine which generates power by burning a mixture of fuel and air in a cylinder thereof.

BACKGROUND ART

Conventionally, Japanese patent application Laid-Open No. 9-53503 (1997) discloses a control apparatus for an internal combustion engine which calculates a quantity of air aspirated into a cylinder thereof based upon in-cylinder pressures detected at two points during a compression stroke. The control apparatus for the internal combustion engine obtains a deviation between the in-cylinder pressures detected at the two points prior to ignition timing during the compression stroke, and reads out the quantity of the air in accordance with the obtained deviation from a map (table) in advance prepared. And the control apparatus injects into the cylinder fuel a quantity of which corresponds to the quantity of the air obtained as described above.

It is, however, not easy to produce a map defining with high accuracy a relation between the intake air quantity and the deviation in the in-cylinder pressures detected at the two points prior to the ignition timing during the compression stroke. Therefore, it is difficult to accurately obtain an intake air quantity in the conventional internal combustion engine.

DISCLOSURE OF THE INVENTION

It is an object of the present invention to provide a control apparatus and a method of calculating an intake air quantity for an internal combustion engine which is useful and capable of accurately calculating a quantity of air aspirated into a cylinder with less load.

A control apparatus for an internal combustion engine according to the present invention is characterized in that a control apparatus for an internal combustion engine which generates power by burning a mixture of fuel and air in a cylinder comprises in-cylinder pressure detecting means, calculating means to calculate a control parameter based upon the in-cylinder pressure detected by the in-cylinder pressure detecting means and an in-cylinder volume at timing of detecting the in-cylinder pressure and intake air quantity calculating means to calculate a quantity of air aspirated into the cylinder based upon the control parameters calculated at at least two points during an intake stroke by the calculating means.

It is preferable that the control parameter includes a product of the in-cylinder pressure detected by the in-cylinder pressure detecting means and a value obtained by exponentiating the in-cylinder volume at the timing of detecting the in-cylinder pressure with a predetermined index.

It is preferable that the intake air quantity calculating means calculates the quantity of the air aspirated into the cylinder based upon a difference in the control parameter between the two points.

Further, it is preferable that the intake air quantity calculating means calculates the quantity of the air aspirated into the cylinder based upon the difference in the control parameter between the two points and heat energies transmitted to a cylinder wall.

In addition, it is preferable that the two points at which the control parameters are calculated are set in accordance with opening/closing timing of an intake valve.

A method of calculating an intake air quantity for an internal combustion engine according to the present invention is characterized in that a method of calculating an intake air quantity for an internal combustion engine which generates power by burning a mixture of fuel and air in a cylinder comprises the steps of:

(a) detecting an in-cylinder pressure;

(b) calculating a control parameter based upon the in-cylinder pressure detected in the step (a) and an in-cylinder volume at timing of detecting the in-cylinder pressure; and (c) calculating a quantity of air aspirated into the cylinder based upon the control parameters calculated at at least two points during an intake stroke.

It is preferable that the control parameter includes a product of the in-cylinder pressure detected in the step (a) and a value obtained by exponentiating the in-cylinder volume at the timing of detecting the in-cylinder pressure with a predetermined index.

It is preferable that the step (c) calculates the quantity of the air aspirated into the cylinder based upon a difference in the control parameter between the two points.

It is preferable that the step (c) calculates the quantity of the air aspirated into the cylinder based upon the difference in the control parameter between the two points and heat energies transmitted to a cylinder wall.

It is preferable that a method of calculating an intake air quantity for an internal combustion engine according to the present invention further includes the step of changing the two points at which the control parameters are calculated, in accordance with opening/closing timing of an intake valve.

BEST MODE FOR CARRYING OUT THE INVENTION

Figure 1:
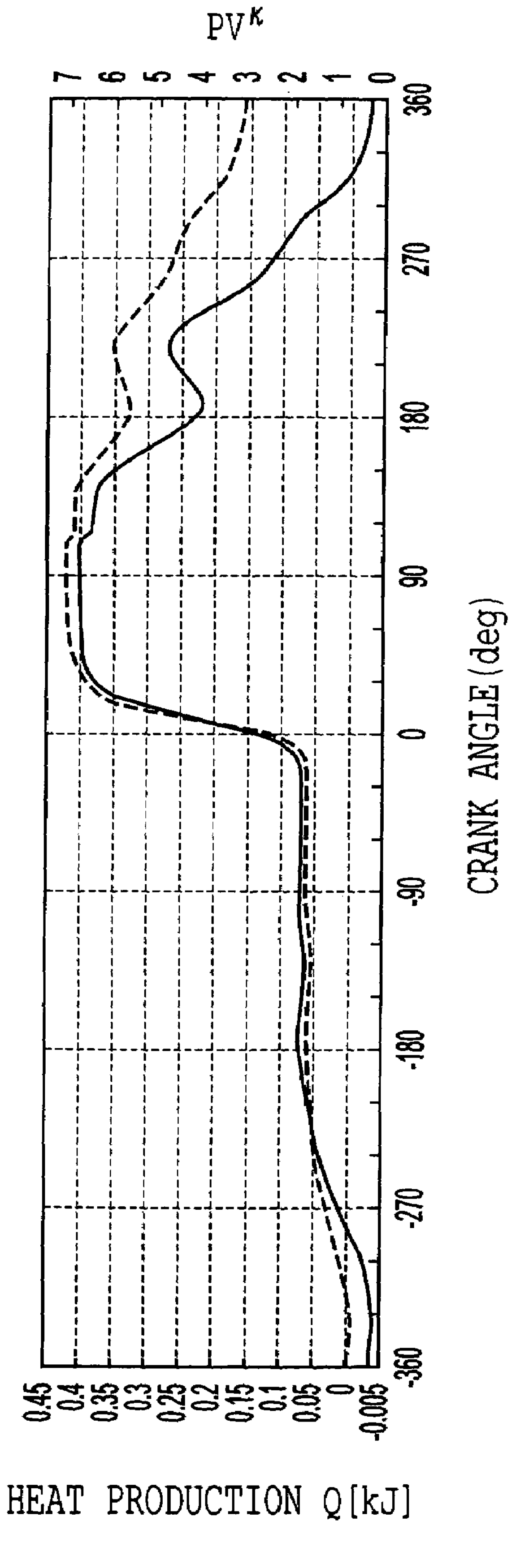
FIG. 1 is a graph showing a correlation between a control parameter $PV^{\kappa}$ used in the present invention and heat production in a combustion chamber.

The inventors have devoted themselves to the study for enabling an excellent control in an internal combustion engine by accurately obtaining a quantity of air aspirated into a cylinder with reduction of calculation loads thereon. The inventors has resulted in focusing attention on a control parameter calculated based upon an in-cylinder pressure detected by in-cylinder pressure detecting means and an in-cylinder volume at timing of detecting the in-cylinder pressure. In more detail, when an in-cylinder pressure detected by the in-cylinder pressure detecting means at a crank angle of $\theta$ is set as $P(\theta)$, an in-cylinder volume at a crank angle of $\theta$ is set as $V(\theta)$ and a ratio of specific heat is set as $\kappa$, the inventors have focused attention on a control parameter $P(\theta)\cdot V^{\kappa}(\theta)$ (hereinafter referred to as $PV^{\kappa}$ properly) obtained as a product of an in-cylinder pressure $P(\theta)$ and a value $V^{\kappa}(\theta)$ determined by exponentiating the in-cylinder volume $(\theta)$ with a ratio $\kappa$ of specific heat (a predetermined index). In addition, the inventors have found out that there is a correlation, as shown in FIG. 1, between a changing pattern of heat production Q in a cylinder for an internal combustion engine to a crank angle and a changing pattern of a control parameter $PV^{\kappa}$ to a crank angle. It should be noted that in FIG. 1, −360°, 0° and 360° respectively correspond to a top dead center, and −180° and 180° respectively correspond to a bottom dead center.

In FIG. 1, a solid line is produced by plotting control parameters $PV^{\kappa}$, each of which is a product of an in-cylinder pressure in a predetermined model cylinder detected for every predetermined minute crank angle and a value obtained by exponentiating an in-cylinder volume at timing of detecting the in-cylinder pressure with a predetermined ratio $\kappa$ of specific heat. In addition, in FIG. 1, a dotted line is produced by calculating and plotting heat production Q in the model cylinder based upon the following expression (1) as $Q=\int dQ$. It should be noted that in any case, $\kappa=1.32$ for simplicity.

[Expression 1]

$$\frac{dQ}{d\theta}=\left\{\frac{dP}{d\theta}V+\kappa\cdot P\cdot\frac{dV}{d\theta}\right\}\cdot\frac{1}{\kappa-1} \qquad (1)$$

Figure 2:
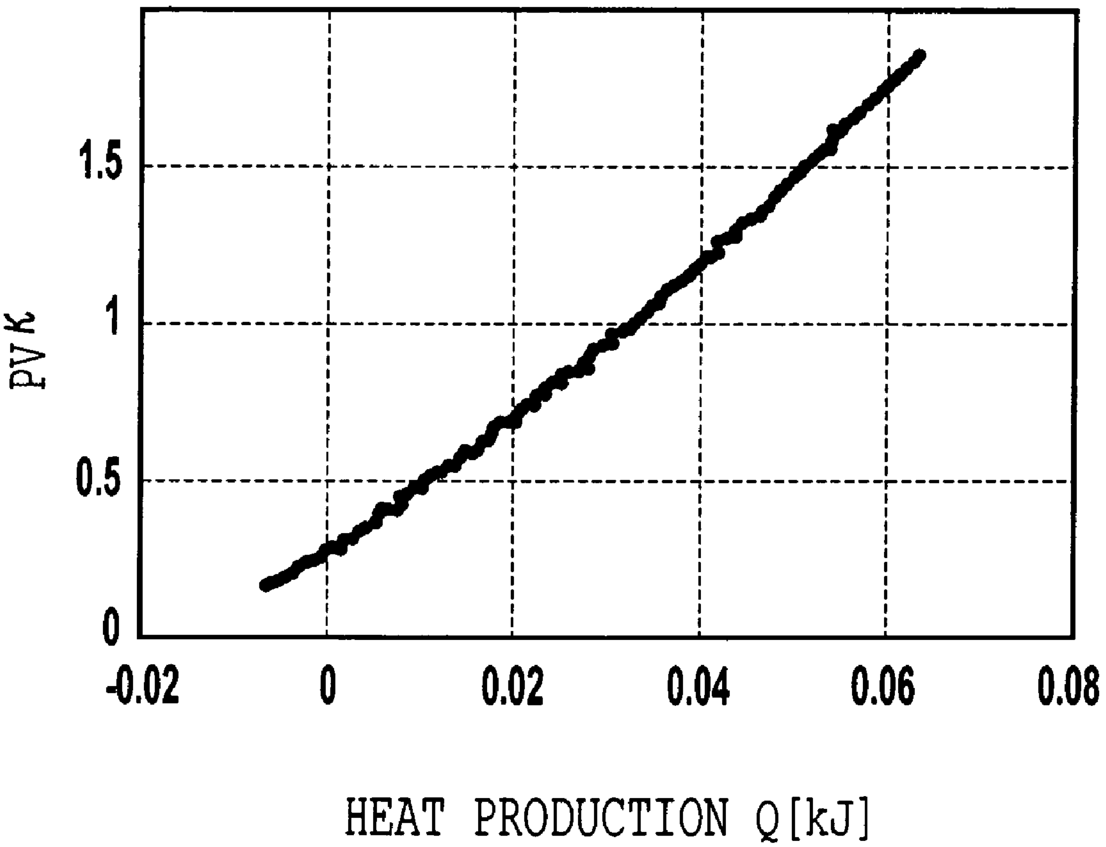
FIG. 2 is a graph showing a correlation between heat production in a combustion chamber and a control parameter $PV^{\kappa}$.

As seen from the result shown in FIG. 1, a changing pattern of heat production Q to a crank angle is generally identical (similarity) to a changing pattern of a control pattern $PV^{\kappa}$ to a crank angle. Further, the inventors have focused attention on a correlation between heat production Q and a control parameter $PV^{\kappa}$ during an intake stroke, i.e. during a period from opening timing of an intake valve to closing timing of the intake valve. As shown in FIG. 2, during a period from the opening timing of the intake valve to the closing timing of the intake valve (the range in which a crank angle is from −353° to −127° in an example in FIG. 2), the control pattern $PV^{\kappa}$ increases generally in proportion to the heat production Q.

Herein, energies of air aspirated into the cylinder during the period from the opening timing of the intake valve to the closing timing of the intake valve is in proportion to an intake air quantity. And the energies of the air aspirated into the cylinder can be obtained from a variation amount of the heat production Q between at least two points during an intake stroke, such as the opening timing of the intake valve and the closing timing of the intake valve. Accordingly, by using a correlation between heat production Q in a cylinder and a control parameter $PV^{\kappa}$ found out by the inventors, a quantity of air aspirated into the cylinder can be accurately calculated from a control parameter $PV^{\kappa}$ calculated based upon an in-cylinder pressure detected by the in-cylinder pressure detecting means and an in-cylinder volume at the timing of detecting the in-cylinder pressure without requiring calculation processing with high loads.

In this case, a quantity of the air aspirated into a predetermined cylinder is preferably calculated based upon a difference in control parameter $PV^{\kappa}$ between the two points. As described above, the control parameter $PV^{\kappa}$ on which the inventors have focused attention reflects heat production Q in a cylinder of an internal combustion engine. Also, the difference in the control parameter $PV^{\kappa}$ between two predetermined points during an intake stroke shows heat production in a cylinder between the two points, i.e. energies of the air aspirated into the cylinder between the two points, and can be calculated with extremely less loads. Accordingly, it is possible to accurately calculate an intake air quantity and to greatly reduce the calculation loads by using a difference in the control parameter $PV^{\kappa}$ between two points during an intake stroke It is preferable that a quantity of air aspirated into a cylinder is calculated based upon a difference in control parameter $PV^{\kappa}$ between the two points and heat energies transmitted to a cylinder wall. In this way, the intake air quantity calculated based upon the difference in the control parameter $PV^{\kappa}$ is corrected in consideration of the heat energies transmitted to the cylinder wall and thereby, it is possible to further improve calculation accuracy of an intake air quantity.

Further, it is preferable that the two points in which the control parameters $PV^{\kappa}$ are calculated in accordance with opening/closing timing of an intake valve. Thereby, it is possible to accurately calculate a quantity of air aspirated into a cylinder based upon a control parameter $PV^{\kappa}$ also in an internal combustion engine provided with so-called a variable valve timing mechanism.

The best mode for carrying out the present invention will be hereinafter explained in detail with reference to the drawings.

Figure 3:
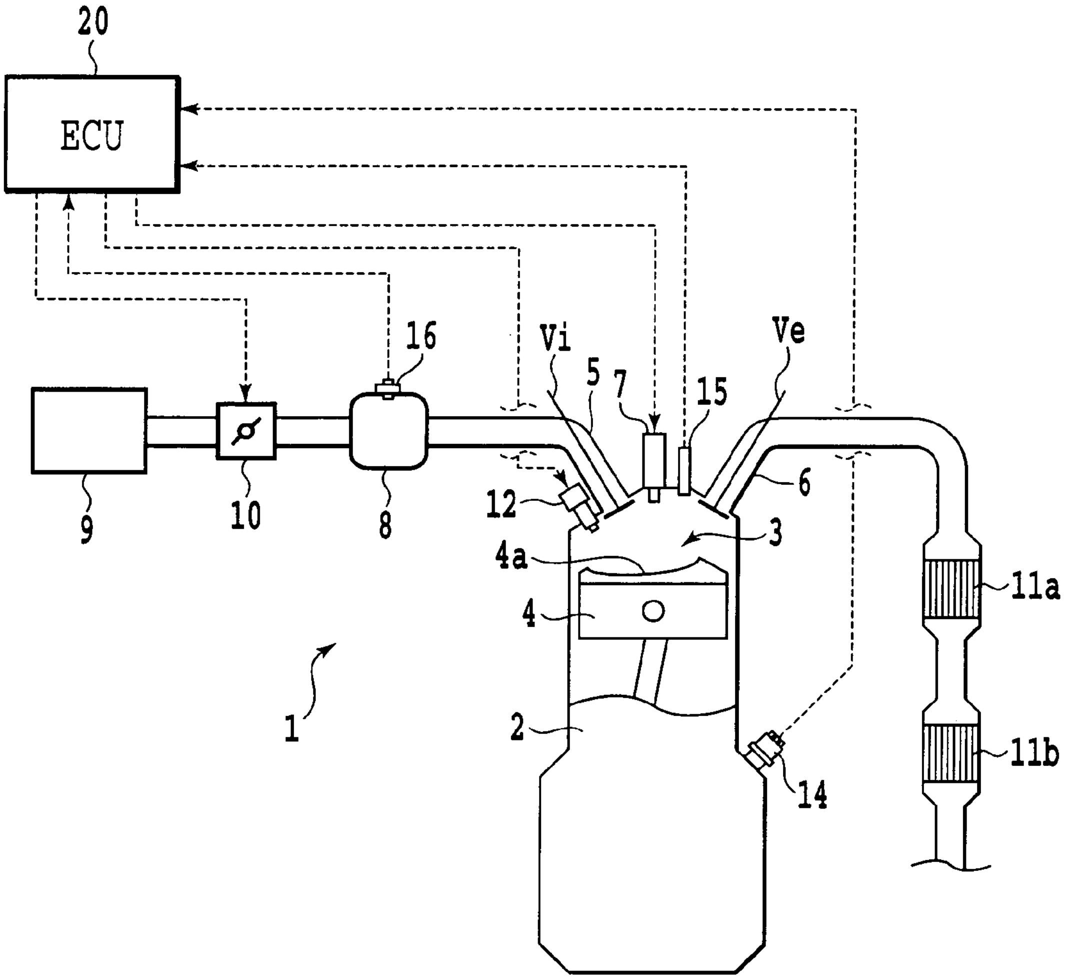
FIG. 3 is a schematic construction view of an internal combustion engine according to the present invention.

FIG. 3 is a schematic construction view showing an internal combustion engine according to the present invention. An internal combustion engine 1 shown in the same figure burns a mixture of fuel and air inside a combustion chamber 3 formed in a cylinder block 2 and reciprocates a piston 4 inside the combustion chamber 3 to produce power. The internal combustion engine 1 is preferably constructed of a multi-cylinder engine and the internal combustion engine 1 in the present embodiment is constructed of, for example, a four-cylinder engine.

An intake port of each combustion chamber 3 is respectively connected to an intake pipe (an intake manifold) 5 and an exhaust port of each combustion chamber 3 is respectively connected to an exhaust pipe (an exhaust manifold) 6. In addition, an intake valve Vi and an exhaust valve Ve are disposed for each chamber 3 in a cylinder head of the internal combustion engine 1. Each intake valve Vi opens/closes the associated intake port and each exhaust valve Ve opens/closes the associated exhaust port. Each intake valve Vi and each exhaust valve Ve are operated by, for example, a valve operating mechanism (not shown) including a variable valve timing function. Further, the internal combustion engine 1 is provided with ignition plugs 7 the number of which corresponds to the number of the cylinders and the ignition plug 7 is disposed in the cylinder head for exposure to the associated combustion chamber 3.

The intake pipe 5 is, as shown in FIG. 3, connected to a surge tank 8. An air supply line L1 is connected to the surge tank 8 and is connected to an air inlet (not shown) via an air cleaner 9. A throttle valve 10 (electronically controlled throttle valve in the present embodiment) is incorporated in the halfway of the air supply line L1 (between the surge tank 8 and the air cleaner 9). On the other hand, a pre-catalyst device 11_a_ including a three-way catalyst and a post-catalyst device 11_b_ including NOx occlusion reduction catalyst are, as shown in FIG. 3, connected to the exhaust manifold 6.

Further, the internal combustion engine 1 is provided with a plurality of injectors 12, each of which is, as shown in FIG. 3, disposed in the cylinder head for exposure to the associated combustion chamber 3. And each piston 4 of the internal combustion engine 1 is constructed in a deep-dish top shape, and the upper face thereof is provided with a concave portion 4*a*. In addition, fuel such as gasoline is directly injected from each injector 12 toward the concave portion 4*a* of the piston 4 inside each combustion chamber 3 in a state air is aspirated into each combustion chamber 3 in the internal combustion engine 1. As a result, in the internal combustion engine 1, a layer formed of a mixture of fuel and air is formed (stratified) in the vicinity of the ignition plug 7 as separated from an air layer in the circumference of the mixture layer, and therefore, it is possible to perform stable stratified combustion with an extremely lean mixture. It should be noted that the internal combustion engine 1 of the present embodiment is explained as what you called a direct injection engine, but not limited thereto, may be of course applied to an internal combustion engine of an intake manifold (intake port) injection type.

Each ignition plug 7, the throttle valve 10, each injector 12, the valve operating mechanism and the like as described above are connected electrically to an ECU 20 which acts as a control apparatus of the internal combustion engine 1. The ECU 20 includes a CPU, a ROM, a RAM, an input and an output port, a memory apparatus and the like (any of them is not shown). Various types of sensors including a crank angle sensor 14 of the internal combustion engine 1 are, as shown in FIG. 3, connected electrically to the ECU 20. The ECU 20 uses various types of maps stored in the memory apparatus and also controls the ignition plugs 7, the throttle valve 10, the injectors 12, the valve operating mechanism and the like for a desired output based upon detection values of the various types of sensors or the like.

In addition, the internal combustion engine 1 includes in-cylinder pressure sensors 15 (in-cylinder pressure detecting means) the number of which corresponds to the number of the cylinders, each provided with a semiconductor element, a piezoelectric element, a fiber optical sensing element or the like. Each in-cylinder pressure sensor 15 is disposed in the cylinder head in such a way that the pressure-receiving face thereof is exposed to the associated combustion chamber 3 and is connected electrically to the ECU 20. Each in-cylinder pressure sensor 15 detects an in-cylinder pressure in the associated combustion chamber 3 to supply a signal showing the detection value to the ECU 20. Further, the internal combustion engine 1 is provided with a temperature sensor 16 detecting an air temperature inside the surge tank 8. The temperature sensor 16 is connected electrically to the ECU 20 and supplies a signal showing the detected air temperature inside the surge tank 8 to the ECU 20.

Next, calculation procedures of a quantity of air aspirated into each combustion chamber 3 for the internal combustion engine 1 will be explained with reference to FIG. 4.

Figure 4:
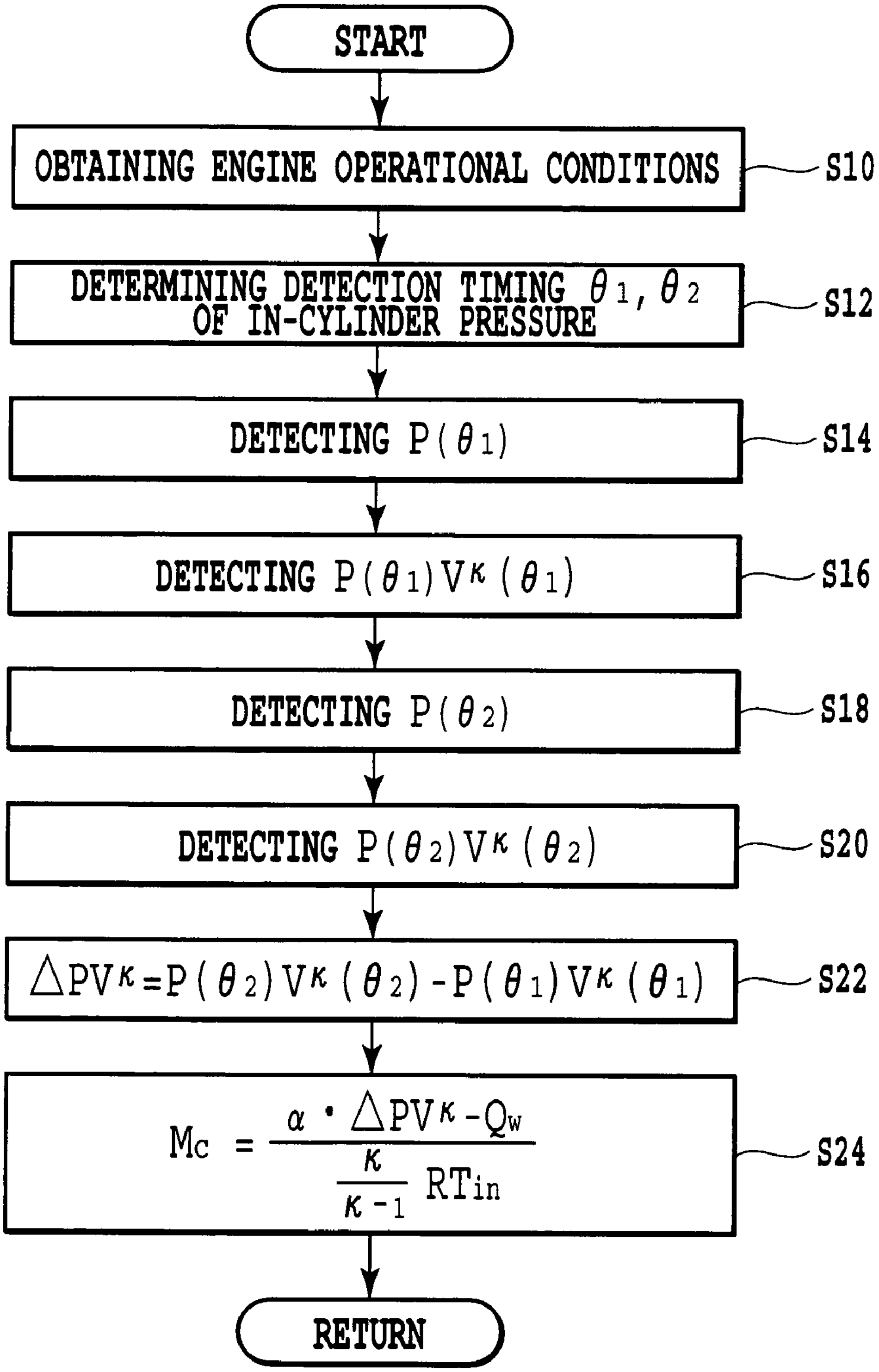
FIG. 4 is a flow chart for explaining a procedure of calculating a quantity of air aspirated into each combustion chamber of the internal combustion engine in FIG. 3.

When the internal combustion engine 1 is started, the ECU 20, as shown in FIG. 4, obtains operational conditions of the internal combustion engine 1 such as an engine rotation speed based upon detection values of various sensors (step S10). Further, when the ECU 20 obtains the operational condition such as an engine rotation speed of the internal combustion engine 1, the ECU 20 determines a crank angle θ1 and a crank angle θ2 (note that θ1<θ2) defining detection timing of an in-cylinder pressure required to calculate a quantity of air aspirated into each combustion chamber 3 (step S12). In the present embodiment, a first timing when the crank angle becomes θ1 corresponds to the opening timing of the intake valve Vi and a second timing when the crank angle becomes θ2 corresponds to the closing timing of the intake valve Vi.

Herein, in the internal combustion engine 1 of the present embodiment, the opening/closing timing of the intake valve Vi is changed in accordance with an operational condition such as an engine rotation speed by a valve operating mechanism. Therefore, at step S12, the ECU 20 obtains an advance amount of the intake valve Vi by the valve operating mechanism in accordance with the engine operational condition, as well as determines the crank angle θ1 and the crank angle θ2 defining the detection timing of the in-cylinder pressure, based upon the obtained advance amount and the basic opening/closing timing of the intake valve Vi. Thus, it is preferable that the first timing and the second timing at which the in-cylinder pressures are detected, i.e. two points at which the control parameters $PV^\kappa$ are calculated, are set in accordance with the opening/closing timing of the intake valve Vi. Thereby, it is possible to accurately calculate a quantity of air aspirated into each combustion chamber 3 based upon a control parameter $PV^\kappa$ in the internal combustion engine 1 provided with the variable valve timing mechanism.

Thereafter, the ECU 20 determines a target torque of the internal combustion engine 1 based upon a signal from a position sensor (not shown) for an accelerator pedal or the like and sets an intake air quantity (the opening of the throttle valve 10) and a fuel injection quantity (fuel injection time) from each injector 12 in accordance with the target torque by using a map or the like in advance prepared. Further, the ECU 20 controls the opening of the throttle valve 10, as well as injects a determined quantity of fuel from each injector 12, for example, during an intake stroke. And the ECU 20 performs ignition by each ignition plug 7 according to a base map for ignition control.

Along with this, the ECU 20 monitors a crank angle of the internal combustion engine 1 based upon a signal from the crank angle sensor 14. And the ECU 20 obtains an in-cylinder pressure P(θ1) in each combustion chamber 3 at the timing when the crank angle becomes θ1 set at step S12 (first timing), based upon a signal from the in-cylinder pressure sensor 15 (step S14). Further, the ECU 20 calculates a control parameter $P(\theta 1)\cdot V^\kappa(\theta 1)$ in each combustion chamber 3 which is a product of the obtained in-cylinder pressure P(θ1) and a value obtained by exponentiating an in-cylinder volume V(θ1) at the timing of detecting the in-cylinder pressure P(θ1), i.e. at the timing the crank angle becomes (θ1), with a ratio κ (κ=1.32 in the present embodiment) of specific heat, and stores the calculated control parameter $P(\theta 1)\cdot V^\kappa(\theta 1)$ in a predetermined memory region of the RAM (step S16).

After the processing of step S16, the ECU 20 obtains an in-cylinder pressure (θ2) in each combustion chamber 3 based upon a signal from the in-cylinder pressure sensor 15 at the timing when the crank angle becomes θ2 set at step S12 (second timing) (step S18). Further, the ECU 20 calculates a control parameter $P(\theta 2)\cdot V^\kappa(\theta 2)$ in each combustion chamber 3 which is a product of the obtained in-cylinder pressure P(θ2) and a value obtained by exponentiating an in-cylinder volume V(θ2) at the timing of detecting the in-cylinder pressure P(θ2), i.e. at the timing the crank angle becomes (θ2), with a ratio κ (κ=1.32 in the present embodiment) of specific heat, and stores the calculated control parameter $P(\theta 2)\cdot V^\kappa(\theta 2)$ in a predetermined memory region of the RAM (step S20).

As described above, when the control parameter $P(\theta 1)\cdot V^\kappa(\theta 1)$ and $P(\theta 2)\cdot V^\kappa(\theta 2)$ is obtained, the ECU 20 calculates a difference in the control parameter $PV^\kappa$ between the first and the second timing in each combustion chamber 3 as $\Delta PV^{\kappa}=P(\theta 2)\cdot V^{\kappa}(\theta 2)-P(\theta 1)\cdot V^{\kappa}(\theta 1)$, and stores the calculated difference in a predetermined memory region of the RAM (step S22).

Herein, the control parameter $PV^{\kappa}$, as described above, is generally in proportion to the heat production Q inside each combustion chamber 3 of the internal combustion engine 1 (refer to FIG. 2), and the difference $\Delta PV^{\kappa}$ in the control parameter $PV^{\kappa}$ between the two points during the intake stroke, i.e. between the first timing (the opening timing of the intake valve) and the second timing (the closing timing of the intake valve) is in proportion to the heat production in each combustion chamber 3 between the first timing when the crank angle=θ1 and the second timing when the crank angle=θ2, i.e. the energies of the air aspirated into each combustion chamber 3 during a period from when the intake valve Vi opens to when the intake valve Vi closes. And the energies of the air aspirated into each combustion chamber 3 during the period from when the intake valve Vi opens to when the intake valve Vi closes are in proportion to an intake air quantity.

Accordingly, a quantity Mc of the air aspirated into each combustion chamber 3 can be calculated according to the following expression (2) when a proportionality constant to heat production Q of the difference a $\Delta PV^{\kappa}$ is set as a.

[Expression 2]

$$Mc = \frac{\dfrac{\alpha \cdot \Delta PV^{\kappa} - Qw}{\kappa}}{\kappa - 1} RT_{in} \quad (2)$$

wherein Qw: heat energies transmitted to the cylinder wall, κ=a ratio of specific heat (κ=1.32 in the present embodiment, for example), R: gas constant, and Tin: temperature of intake air.

As shown in FIG. 4, The ECU 20 calculates a quantity of air aspirated into each combustion chamber 3 during a period when the intake valve Vi opens by using, in the above expression (2), the difference $\Delta PV^{\kappa}$ in the control parameter $PV^{\kappa}$ between the first and the second timing obtained at step S22, a temperature of the intake air (air in the surge tank 8) detected by the temperature sensor 16, and heat energies Qw transmitted to the cylinder wall read out from a predetermined map (step S24).

Thus, by using the correlation between the heat production Q in each combustion chamber 3 and the control parameter $PV^{\kappa}$, a quantity of the air aspirated into the cylinder can be accurately calculated without requiring high calculation processing loads from the control parameter $PV^{\kappa}$ calculated based upon the in-cylinder pressure detected by the in-cylinder pressure sensor 15 and the in-cylinder volume at the timing of detecting the in-cylinder pressure.

And the ECU 20 performs, for example, an air-fuel ratio control or the like of the internal combustion engine 1 by using the intake air quantity Mc into each combustion chamber 3 calculated as described above. As a result, in the internal combustion engine 1 of the present embodiment, a highly accurate engine control is simply performed with less loads. In particular, since an intake air quantity is calculated based upon the difference $\Delta PV^{\kappa}$ in control parameter $PV^{\kappa}$ between two points during the intake stroke in the internal combustion engine 1, a defect that poor combustion is invited due to lag of injection timing of fuel, as in a case of obtaining an intake air quantity based upon in-cylinder pressures at two points during a compression stroke, is securely prevented.

Further, according to the present embodiment, in the event an intake air quantity is calculated according to the above expression (2), the intake air quantity calculated based upon the difference $\Delta PV^{\kappa}$ in the control parameter $PV^{\kappa}$ is corrected by the heat energies Qw transmitted to the cylinder wall. With this, in the present embodiment, it is possible to further improve calculation accuracy of an intake air quantity Mc. Note that a map for obtaining heat energies Qw transmitted to the cylinder wall is in advance prepared for defining a relation between the heat energies Qw, and a temperature of an intake air and a temperature of the cylinder wall or the like. The ECU 20 reads out heat energies Qw transmitted to the cylinder wall from the map, based upon a detection value of the temperature sensor 16 or a temperature of the cylinder wall detected by a temperature sensor (not shown).

INDUSTRIAL APPLICABILITY

The present invention is useful in realizing a control apparatus and a method of calculating an intake air quantity for an internal combustion engine which is useful and capable of accurately calculating a quantity of air aspirated into a cylinder with less loads.

The invention claimed is:

1. A control apparatus for an internal combustion engine which generates power by burning a mixture of fuel and air in a cylinder thereof, comprising:

in-cylinder pressure detecting means;

calculating means to calculate a control parameter based upon the in-cylinder pressure detected by the in-cylinder pressure detecting means and an in-cylinder volume at timing of detecting the in-cylinder pressure; and intake air quantity calculating means to calculate a quantity of air aspirated into the cylinder based upon the control parameters calculated at at least two points during an intake stroke by the calculating means.

2. The control apparatus for the internal combustion engine according to claim 1, wherein:

the control parameter includes a product of the in-cylinder pressure detected by the in-cylinder pressure detecting means and a value obtained by exponentiating the in-cylinder volume at the timing of detecting the in-cylinder pressure with a predetermined index.

3. The control apparatus for the internal combustion engine according to claim 2, wherein:

the intake air quantity calculating means calculates the quantity of the air aspirated into the cylinder based upon a difference in the control parameter between the two points.

4. The control apparatus for the internal combustion engine according to claim 3, wherein:

the intake air quantity calculating means calculates the quantity of the air aspirated into the cylinder based upon the difference in the control parameter between the two points and heat energies transmitted to a cylinder wall.

5. The control apparatus for the internal combustion engine according to claim 1, wherein:

the two points at which the control parameters are calculated are set in accordance with opening/closing timing of an intake valve.

6. A method of calculating an intake air quantity for an internal combustion engine which generates power by burning a mixture of fuel and air in a cylinder, comprising the steps of:

(a) detecting an in-cylinder pressure;

(b) calculating a control parameter based upon the in-cylinder pressure detected in the step (a) and an in-cylinder volume at timing of detecting the in-cylinder pressure; and (c) calculating a quantity of air aspirated into the cylinder based upon the control parameters calculated at at least two points during an intake stroke.

7. The method of calculating the intake air quantity for the internal combustion engine according to claim 6, wherein:

the control parameter includes a product of the in-cylinder pressure detected in the step (a) and a value obtained by exponentiating the in-cylinder volume at the timing of detecting the in-cylinder pressure with a predetermined index.

8. The method of calculating the intake air quantity for the internal combustion engine according to claim 7, wherein:

the step (c) calculates the quantity of the air aspirated into the cylinder based upon a difference in the control parameter between the two points.

9. The method of calculating the intake air quantity for the internal combustion engine according to claim 8, wherein:

the step (c) calculates the quantity of the air aspirated into the cylinder based upon the difference in the control parameter between the two points and heat energies transmitted to a cylinder wall.

10. The method of calculating the intake air quantity for the internal combustion engine according to claim 6, further comprising the step of:

changing the two points at which the control parameters are calculated, in accordance with opening/closing timing of an intake valve.

* * * * *